Jan. 9, 1940.    R. E. TETENS    2,186,277
GROMMET SEAL
Filed Nov. 21, 1938
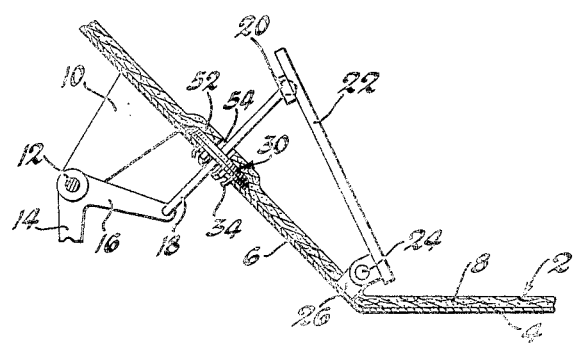
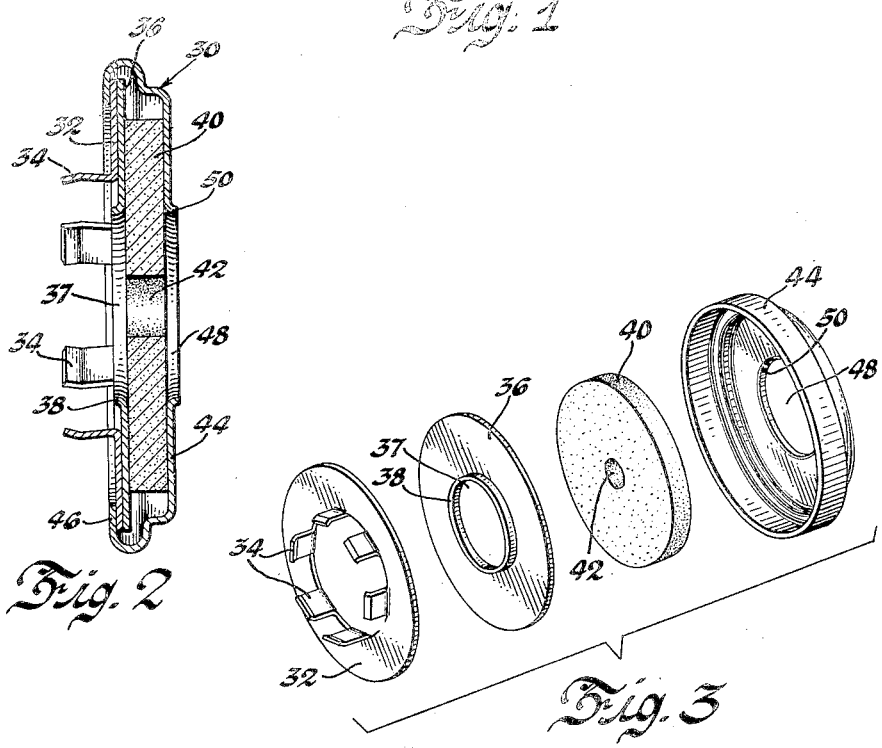
Inventor
Raymond E. Tetens
By Blackmore, Spencer & Flint
Attorneys Patented Jan. 9, 1940

2,186,277

UNITED STATES PATENT OFFICE 2,186,277

GROMMET SEAL

Raymond E. Tetens, Lansing, Mich., assignor to General Motors Corporation, Detroit, Mich., a corporation of Delaware Application November 21, 1938, Serial No. 241,604

4 Claims. (Cl. 74—566)

This invention relates to improvements in a grommet seal and has particular reference to a grommet seal applied around the operating rod of the accelerator pedal of an automotive vehicle although the invention is capable of use in other relations.

The usual accelerator pedal on the automobile has a rod extending therefrom which rod in turn operates a linkage leading to the throttle of the carburetor. In moving the accelerator pedal downward, the rod will not only have a movement at substantially right angles to the accelerator pedal, but there will be a slight lateral movement and for this reason it is necessary to have an oversized opening in the toeboard of the vehicle. This opening will serve as a means to allow air and dust particles to enter the vehicle and the object of the present invention is to design a flexible grommet which has a number of moving parts, the grommet being enabled tightly to grip the accelerator pedal rod and allow a limited movement while at the same time forming a seal between the accelerator pedal rod and the floor board.

The grommet of the invention consists of a base element having prongs which fit into an opening in a support. Over this base element there is positioned a flat metal disc and over the disc a compressible washer element which may be made of felt, rubber, or the like, and over this compressible element there is positioned the housing which encloses the parts and holds them in assembled relation by having its edge turned over the edge of the base element. The base element is the only member which is stationary and all of the other elements are relatively movable relative to the base and to each other.

On the drawing

Figure 1 is a sectional view through the toeboard and floor of an automobile showing the invention applied.

Figure 2 is an enlarged sectional detailed view through the grommet of the invention.

Figure 3 is an expanded view showing the parts of the grommet of the invention.

Referring to the drawing, the numeral 2 indicates an automotive vehicle as a whole. The vehicle has the floor 4, the inclined toeboard 6, and over the floor and toeboard the usual floor matting or rubber covering 8 is positioned. The underside of the floor board has a bracket 10 secured thereto and a shaft 12 mounted in this bracket serves as a mounting for a bell crank lever 14. This bell crank lever 14 is connected in the usual way to the throttle of the carburetor. One arm 16 of the bell crank lever has connected to an opening in its end the lower end of a shank or rod 18 which extends through an opening in the toeboard 6 and has its upper end secured as at 20 to the accelerator pedal 22, pivoted at 24 to a bracket 26, secured to the toeboard 6. The parts so far described are conventional, and per se form no part of the invention.

The novel grommet of the invention is indicated as a whole at 30 and comprises the flat base element 32 having a plurality of prongs 34 extending from the edge of the central opening therein and which prongs 34 serve to secure the grommet in place on a support such as the toeboard 6 of the vehicle. The opening in the toeboard 6 will be of slightly less diameter than the over-all diameter of the prongs so that in forcing the prongs into place they will be slightly sprung and rigidly hold the grommet to the toeboard or support.

Over the base element 32 and relatively movable thereon there is positioned the disc 36 which has a central opening 37 and a flange 38 which extends into the opening of the base element 32. Over the disc 36 there is positioned the compressible washer 40 having the central opening 42. This compressible washer may be made of rubber, felt, or the like and the opening 42 thereof is of sufficient size to contact the rod 18 which passes therethrough. This washer 40 is movable relative to the disc 36.

Over the disc 36 and the compressible washer 40 there is positioned the outer or housing member 44. This housing member has the inturned flange 46 extending on the underside of the base element 32 and serves to hold the parts in assembled relation or in the position shown in Figure 2. This housing 44 is movable relative to the base 32 and relative to the washer 40. The housing 44 is provided with a central opening 48 having a flange 50 for strengthening purposes. The housing 44 in the expanded view of Figure 3 is shown before the flange 46 is turned over on the base element 32. It will be noted that the openings in the various parts of the grommet are concentric and allow for the ready passage of the rod 18 of the accelerator pedal. The opening 42 in the compressible member 40 is of sufficient size snugly to receive the rod 18 while the other openings such as 48 are of much larger size.

In its final assembly, as shown in Figure 2, the grommet is relatively flat and may easily be positioned flatwise on the floor board to allow the matting or cover 8 to fit flatwise thereover as shown at 52 in Figure 1. The covering 8 is also provided with an oversized opening 54 to allow the shank 18 to pass therethrough.

In the operation of the device, if the operator of the vehicle should depress the accelerator pedal 22 he will force the rod 18 through the opening 42 in the grommet and as the movement of the lower end of the rod 18 is slightly to the right in Figure 1 and the upper end is slightly to the left, there will be a partial bodily movement of the rod 18 which will cause a sidewise movement of the compressible washer 40. If the washer should not yield, there is sufficient play between parts 32, 36, 40, and 44 to allow free intermovement at one of the contacting surfaces so that there will be no binding action on the rod 18. The opening 42 being snugly in contact with the rod 18, any air or dust particles will be prevented from passing into the vehicle.

I claim:

1. In a grommet seal, a base element adapted to be attached to a support, a disc positioned over said base element and capable of movement relative thereto, a fabric washer positioned over said disc and capable of movement relative to said base element and said disc, and an outer housing member positioned over the fabric washer and movably secured to the base element, all of said parts having concentric openings to enable the passage of a shank therethrough, said fabric washer being in contact with said shank.

2. In a grommet seal, a base element adapted to be secured to a support, a plurality of movable members positioned over said base and held thereon by one of said members, each of said parts having a central opening to allow the passage of a shank therethrough, one of said parts being made of a yieldable substance to contact with the shank to make a seal.

3. In a grommet seal, a flat base element having thereon means to enable it to be attached to a support, a flat disc on said base element and movable relative thereto, a flat compressible washer over said disc and movable relative to said disc and element, a housing over said compressible member and having its edge turned around the edge of said base element to secure the parts in assembled relation, each of said parts having an opening to enable the passage of a rod therethrough.

4. In a grommet seal, a flat base element having thereon a plurality of prongs to enable the element to be removably secured to a support, said element having a central opening, a metal disc over said element and having a central opening with a flange at the edge thereof, said flange extending into the opening of the base element, said element and disc being relatively movable, a compressible washer over said disc, and a housing over said washer and secured in movable relation to said base element, said washer and housing being relatively movable and movable relative to said base element and said disc, said housing having an opening aligned with the openings in the washer, disc, and base element, said openings adapted to allow a shank to pass therethrough, said compressible member being in contact with said shank.

RAYMOND E. TETENS.